(12) United States Patent
Tite et al.

(10) Patent No.: US 6,648,097 B2
(45) Date of Patent: Nov. 18, 2003

(54) SEISMIC METHODS HAVING EXTENDED ENERGY RELEASE

(75) Inventors: Glen-Allen Tite, Stafford, TX (US); James E. Brooks, Manvel, TX (US); Wallace E. Voreck, Sparta, NJ (US)

(73) Assignee: Schlumberger Technology Corporation, Sugarland, TX (US)

( * ) Notice: Subject to any disclaimer, the term of this patent is extended or adjusted under 35 U.S.C. 154(b) by 23 days.

(21) Appl. No.: 09/902,958

(22) Filed: Jul. 11, 2001

(65) Prior Publication Data

US 2003/0010565 A1 Jan. 16, 2003

(51) Int. Cl.$^7$ .................................................. G01V 1/06
(52) U.S. Cl. ....................................................... 181/116
(58) Field of Search ................................ 181/116, 108, 181/102, 106, 118, 112, 115, 111, 103–105

(56) References Cited

U.S. PATENT DOCUMENTS

| | | | |
|---|---|---|---|
| 3,574,298 A | | 4/1971 | Larson |
| 3,707,188 A | * | 12/1972 | Heckman .................... 166/247 |
| 3,851,589 A | | 12/1974 | Meyer |
| 3,937,296 A | | 2/1976 | Larson |
| 4,300,653 A | | 11/1981 | Cao et al. |
| 4,953,657 A | | 9/1990 | Edington |
| 5,088,413 A | * | 2/1992 | Huber et al. ................ 102/200 |
| 6,120,627 A | * | 9/2000 | Badger et al. .............. 102/293 |

* cited by examiner

Primary Examiner—Kimberly Lockett
(74) Attorney, Agent, or Firm—Williams, Morgan and Amerson (57) ABSTRACT

An improved seismic method comprises the steps of generating seismic waves by exploding an explosive device in a subterranean formation, wherein the explosive device comprises a plurality of explosive elements whereby there is a time delay between the detonations of the individual explosive elements, and detecting the seismic waves and/or reflections thereof with seismic detectors. Also disclosed are geophysical survey systems that comprise a seismic energy source comprising an explosive device that comprises a plurality of explosive elements, the seismic energy source being located in a subterranean formation, and a plurality of seismic detectors that are adapted to detect seismic waves and/or reflections generated when the seismic energy source explodes.

51 Claims, 5 Drawing Sheets

SEISMIC METHODS HAVING EXTENDED ENERGY RELEASE

BACKGROUND OF THE INVENTION

1. Field of the Invention

The present invention relates generally to the field of geophysical surveying. More particularly, it concerns seismic methods and geophysical survey systems for petroleum and gas exploration that rely on an explosive seismic energy source.

2. Description of Related Art

Seismic geophysical surveys are used in petroleum and gas exploration to map the following: stratigraphy of subterranean formations, lateral continuity of geologic layers, locations of buried paleochannels, positions of faults in sedimentary layers, and basement topography. Such maps are deduced through analysis of the nature of reflections and refractions of generated seismic waves from interfaces between layers within the subterranean formation.

A seismic energy source is used to generate seismic waves that travel through the earth and are then reflected by various subterranean formations to the surface of the earth. As the seismic waves reach the surface, they are detected by an array of seismic detection devices, known as geophones, which transduce waves that are detected into representative electrical signals. The electrical signals generated by such an array are collected and analyzed to permit deduction of the nature of the subterranean formations at a given site.

Seismic energy sources that have been used in geophysical survey methods for petroleum and gas exploration include impact sources, gun sources, vibratory sources and explosives. The nature of output seismic energy depends on the type of seismic energy source that was used to generate it.

Fundamentally, an impact source is a weight striking the surface of the earth directly or impacting a plate placed on the earth's surface, yielding seismic energy. A weight-drop is an example of the former type of impact source. While impact sources tend to be relatively inexpensive and simple to operate and maintain, their principal disadvantage is that they are inefficient at producing seismic energy useful for geophysical survey of deeper layers. Impact sources yield a relatively high proportion of low frequency, surface waves and output less seismic energy than other seismic energy sources.

Gun sources, like impact sources, transfer kinetic energy into seismic energy. They rely on the sudden, powerful release of a charge of pressurized gas, usually compressed air from an air gun, to generate seismic waves. Gun sources have an advantage over impact sources in that they produce more seismic energy than is possible with simple impact sources. The seismic energy generated by gun sources also tends to be of higher-frequency than that imparted by impact sources, and this helps to minimize surface wave generation and improve resolution. However, gun source equipment tends to be more bulky and expensive than simple impact sources.

Vibratory sources are also used as seismic energy sources in geophysical survey methods. Two categories of vibratory sources include those that generate seismic waves originating at the surface and those that generate seismic waves that emanate from downhole. One mechanical-hydraulic vibratory source, the VIBROSEIS truck, is specially designed to place all of its weight onto a large platform which vibrates. This vibration, in turn, produces seismic waves in the subterranean formation. VIBROSEIS trucks have been used extensively in geophysical survey methods, not just for the petroleum and gas exploration, but also for studying the evolution and development of specific geological structures (e.g., the Rocky Mountains) and fault lines. Vibratory sources tend to produce highly repeatable seismic energy. The nature of the energy delivered into the ground by vibratory sources, its amount, duration, and time of delivery, can be tightly controlled and therefore the seismic energy generated tends to be very reproducible, which is a benefit. However vibratory sources are often not suited to certain types of terrain. For example if the ground is very soft, it can be difficult to use VIBROSEIS trucks as a seismic energy source.

Another type of seismic energy source used in geophysical survey relies on explosives. Explosive seismic energy sources used in petroleum and gas exploration on land rely on the explosion of material placed within a subterranean formation to generate seismic waves. Typically, a hole is drilled in the ground, the explosive is placed in the hole, and backfill is piled on top of the explosive, prior to initiating the explosion. Compared on a pound for pound basis to gun sources and impact sources, explosive sources impart the highest amount of seismic energy into the ground. Explosive seismic energy sources currently being used in geophysical survey methods generally produce waves of very high frequency. They are often used when the ground conditions are such as to prevent the effective use of impact or gun sources (e.g., when the ground is extremely soft). In transition zone applications, since the sources are positioned in shallow holes, there is an environmental concern about the explosive blowing up the hole and creating an environmental scar. This can limit the amount of explosive that can be used and therefore the quality of the seismic data.

At present, the demand for seismic exploration methods that generate sharper energy pulses, which can result in higher resolution images, has led to sacrificing the generation of low frequency seismic waves. This loss of low frequency waves (e.g., >3 seconds) compromises the ability to image deeper targets. While VIBROSEIS has been used successfully in mapping deeper targets, it has been difficult to achieve the same quality of results using explosive seismic sources. This presents a significant problem when there is a need for mapping deeper subterranean formations but the ground conditions are not suited to VIBROSEIS. In the past, the response has been to drill deeper boreholes and use more explosive material to achieve the desired results at such difficult mapping sites. Both drilling deeper and using more explosive material substantially increases the cost of subterranean mapping of a particular site.

There is a need for improved seismic methods and geophysical survey systems that efficiently generate low frequency seismic waves when needed. Furthermore, it would be advantageous to be able to use shallower boreholes and less explosive material to achieve the necessary level of data resolution for geophysical surveys.

SUMMARY OF THE INVENTION

This invention provides improved seismic methods and geophysical survey systems that are well suited for petroleum and gas exploration, but could be used for other purposes as well.

One embodiment of the invention is an apparatus for generating seismic waves comprising a housing, a plurality of explosive elements enclosed within the housing, and at least one barrier element separating the explosive elements. The barrier element can comprise an inert material, a non-explosive material or an explosive material having reactive properties different than the explosive elements. The apparatus can further comprise at least one detonation device where the detonation devices are located within the explosive elements and are connected to a detonation controller device capable of imposing controllable time delays between individual detonations. The explosive elements can comprise shaped charges.

Another embodiment of the invention is a seismic method that comprises the steps of generating seismic waves by detonating an explosive device in a subterranean formation, and detecting the seismic waves and/or reflections thereof with seismic detectors. The explosive device used in this method comprises a plurality of explosive elements such that the individual elements explode at differing times. The explosive device can be constructed in a manner so that it can be placed in a borehole within the subterranean formation, and covered with backfill before being exploded.

In yet another embodiment of the invention, the explosive elements are separated by a barrier material that can delay the detonation of adjacent explosive elements, such as a non-explosive flammable material. The explosive device can include a housing that encases the explosive elements and the barrier material and can also include one or more detonation devices with which to initiate the explosions. Each detonation device is typically connected to a detonation control device that activates the individual detonation devices.

In still another embodiment of the invention, the explosive elements are separated by a barrier material that will prevent the detonation of adjacent explosive elements, such as with an inert material. The explosive elements are then individually equipped with detonation devices that can be activated individually by a detonation control device at the surface. The detonation control device can have the ability to activate the detonation devices with pre-selected or controllable time delays between the individual detonations. There can be a plurality of detonation devices that are each connected to an explosive element where the detonation control device detonates the explosive elements at different times. The time delay between detonations can be less than 100 milliseconds and typically is between 0.1 and 100 milliseconds. The explosive elements can optionally comprise shaped charges that can enhance the directional focus of the explosive force. The explosive elements can be stacked on top of each other to facilitate placement into a single borehole, but it would also be possible to have the explosive elements arranged horizontally with respect to each other, or located in separate boreholes spaced at specific distances from each other.

One specific embodiment of the invention is a seismic method that comprises the steps of generating seismic waves by detonating an explosive device in a subterranean formation, wherein the explosive device comprises explosive elements that detonate in a time delayed sequence, and detecting the seismic waves and/or reflections thereof with seismic detectors.

Another embodiment of the invention is a geophysical survey system, comprising a seismic energy source that includes an explosive device that can consist of multiple explosive elements that are capable of being exploded at different times. The system includes a detonation control device that is capable of detonating the various explosive elements at different times. The system also includes a plurality of seismic detectors that are adapted to detect seismic waves and/or reflections generated when the seismic energy source explodes. The seismic detectors transduce an electrical signal representative of the seismic waves and the reflections of seismic waves they detect. The system can also comprise a data acquisition and processing system that is in communication with the seismic detectors, for example through electrical data cables or by wireless data transmission. The data acquisition and processing system can sample the electrical signals generated by the seismic detectors and produce data representative thereof, for example by sampling and summing the data collected.

In one embodiment of the geophysical survey system, the explosive device can include a housing and can be located in a borehole. The various explosive elements can be separated by barrier elements that can include inert material. The explosive elements can be individually equipped with a detonation device that can be activated by a detonation control device capable of imposing controllable time delays between individual detonations. The geophysical survey system can comprise a plurality of detonation devices that are each connected to an explosive element, and the detonation control device can detonate the elements at different times providing a pre-selected time delay between the individual detonation devices. The explosive device can comprise, for example, a plurality of explosive elements that include shaped charges and are located on top of each other in a cylindrical arrangement.

Another embodiment of the invention is a downhole seismic source for generating an energy pulse comprising a detonator and a shaped charge device within a housing. The shaped charge device comprising an explosive element and a plurality of shaped charges arranged to focus the energy pulse in predetermined orientation. The shaped charges can be positioned in what is referred to as a cascading configuration. They can be arranged in a generally vertical orientation with each other and connected longitudinally to each other and can thereby define a common longitudinal bore within the shaped charge device. The shaped charges are capable of collapsing in a sequential order upon the detonating of the explosive element, thereby forming a jet or a metallic mass slug. This sequential collapsing of the shaped charges is capable of imparting an extended directed energy pulse that can be coupled to the earth thereby producing seismic waves.

Yet another embodiment is a seismic method comprising the steps of providing an explosive device comprising a housing enclosing a plurality of shaped charges. The explosive element is detonated thus collapsing the shaped charges and forming an extended directed force. This force is imparted onto a subterranean formation, creating seismic waves within the subterranean formation. The seismic waves and/or reflections are then detected with seismic detectors. The directed force can comprise a plurality of jets or slugs of metallic mass. In this method the shaped charges collapse in sequential order and there exists a time delay between the collapse of the individual shaped charges. The time delay between the collapse of the individual shaped charges is determined by the design and placement of the shaped charges in relation to the explosive element.

Still another embodiment of the invention is an apparatus for generating seismic impulses comprising an explosive element, a detonator and a mass flyer element located within a housing. The mass flyer may be attached to the explosive element and is capable of moving from an upper position to a lower position. When the explosive element is detonated it produces expanding gases. The apparatus can further comprise a spring that is affixed to the bottom of the housing and contacts the mass flyer when the mass flyer is in its lower position.

An embodiment of the invention is a method for generating seismic impulses comprising providing an apparatus comprising an explosive element and a mass flyer element located within a housing. The mass flyer is accelerated from an upper position towards a lower position where the mass flyer impacts onto the bottom of the housing creating a force that is imparted onto a subterranean formation. This force creates seismic waves and the seismic waves and/or reflections thereof are then detected with seismic detectors. A spring can be affixed to the housing whereby the spring contacts the mass flyer when the mass flyer is in its lower position where the spring decelerates the mass flyer upon contact with the moving mass flyer. The explosive element can be detonated, thereby producing expanding gases that propel the mass flyer towards its lower position.

Embodiments of the present invention have the ability to increase the duration of the explosion and thereby increase the quantity of low frequency seismic waves. This allows the use of less explosive material and/or shallower boreholes than in prior seismic methods.

An additional benefit of the current invention is that the explosive elements used in the seismic methods and the geophysical survey systems can be shaped to give greater directivity to the seismic energy.

DESCRIPTION OF ILLUSTRATIVE EMBODIMENTS

The present invention provides various means of generating seismic waves by using an explosive seismic energy source. The seismic energy source comprises one or more explosive devices. In some embodiments a barrier that separates the explosive elements from each other can delay or prevent the detonation of adjacent explosive elements. The energy that is created by the detonation of the explosive elements is transferred or "coupled" to the earth to create seismic waves that propagate through and reflect off subterranean formations.

This application gives examples of various types of explosive materials and elements that can be used but this is not meant to be an exhaustive listing of possible explosive materials. Other types of explosive material may be used in the present invention, for example, any of the common explosives used within the oilfield industry and shaped charge devices.

Figure 1:
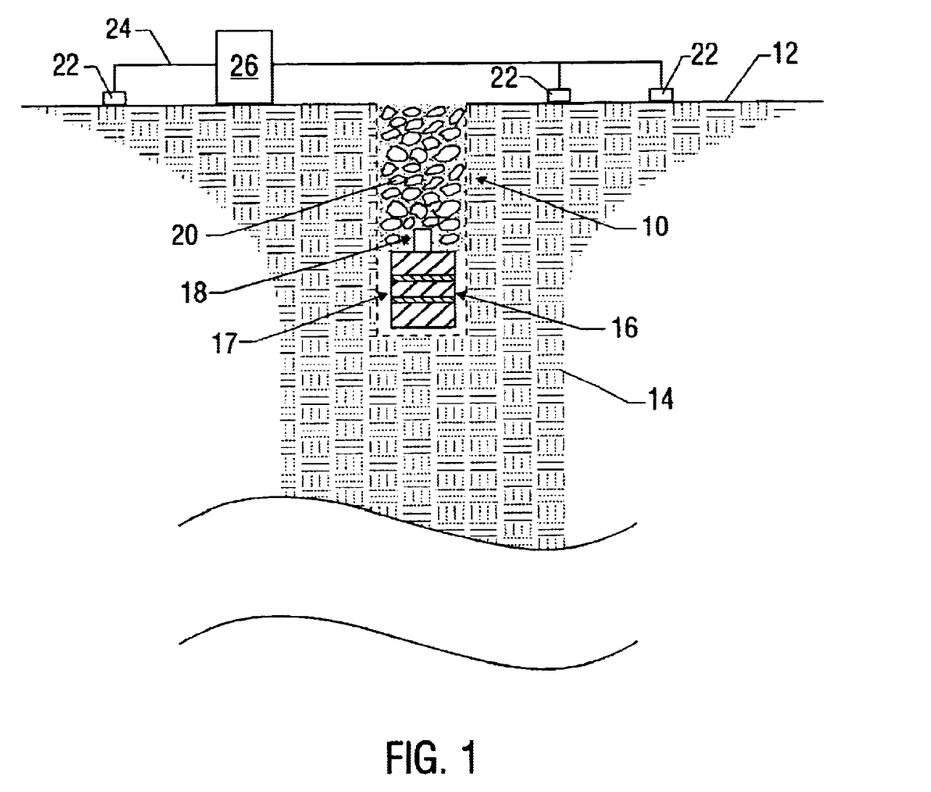
FIG. 1 is a schematic of an embodiment of a seismic survey system of the present invention.

FIG. 1 shows an embodiment of a geophysical survey system of the present invention. A borehole 10 is drilled from the surface of the ground 12 into a subterranean formation 14. This borehole will typically be about 5–150 feet deep. An explosive device 17 is placed into the borehole. Normally the explosive device will include a housing or container 16. A detonation device 18, such as a blasting cap, is normally inserted into the container 16, and connected by a wire or cable to a source of electrical energy (not shown in FIG. 1) that can trigger the explosion. Backfill 20 is typically placed on top of the explosive device 17, to direct the energy released from the explosion as much as possible into the ground, rather than upward through the borehole. A plurality of geophones 22 are arranged at various points on the surface 12 of the ground, and are connected by cables 24 to a data acquisition and processing system 26, which will typically comprise a computer. Suitable data acquisition and processing systems, geophones, and methods for their placement and operation are well known to persons skilled in the field of seismic surveying. When the explosive device in the borehole is detonated, seismic waves propagate through the earth and are then reflected by various subterranean formations to the surface of the earth. The array of geophones and the data acquisition and processing system can then detect the seismic wave reflections and process the data to place it into a form that can be interpreted by humans. In particular, the geophones transduce an electrical signal representative of the seismic waves and the reflections of seismic waves they detect. The data acquisition and processing system samples the electrical signals generated by the geophones and produces data representative thereof.

Figure 2:
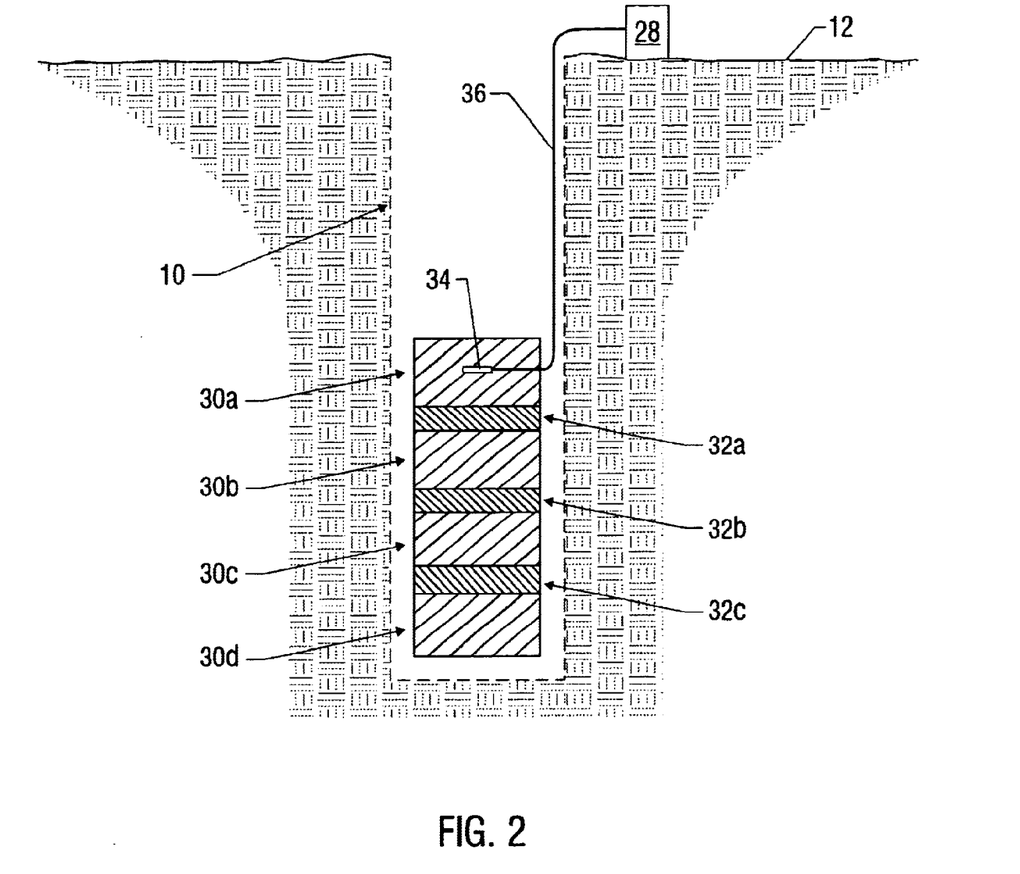
FIG. 2 is a more detailed illustration of an embodiment of the explosive device within a subterranean borehole.

FIG. 2 illustrates one embodiment of the invention where the explosive device is placed within a borehole 10 and comprises a plurality of explosive elements 30A, 30B, 30C, and 30D, the individual explosive elements being separated from each other by barrier elements 32A, 32B, and 32C. The explosive device further comprises a detonation device 34, such as a blasting cap, that is connected to a detonation control device 28 at the surface 12 by means of a detonation wire 36.

The barrier elements 32A–C in this embodiment of the invention comprise material that will create a time delay in the detonation propagation from one explosive element to an adjacent explosive element. This delayed propagation will generate a longer duration explosion that can have beneficial seismic wave characteristics. The time delays can be chosen to maximize low-frequency seismic waves. The time delays can be on the order of 0.1 millisecond to 100 milliseconds, depending on the desired shape of the output signature (pressure vs. time) sought. The barrier elements can comprise material that has different explosive characteristics than the explosive elements. The term "different explosive characteristics" is used to describe a material that has a slower explosive propagation rate or less explosive potential than the explosive elements themselves. The material can be totally non-explosive and non-flammable, typically referred to as inert material, whereby the detonation of one explosive element will not detonate the next explosive element. The material can also be explosive or flammable to an extent that the detonation of one explosive element will propagate to the next explosive element, but will do so in a time delayed manner, even if the delay is only within, for example, the range of 0.1 to 100 milliseconds.

An electrical charge from the detonation control device 28 will be transmitted through the detonation wire 36 to the detonation device 34 that is located within one of the explosive elements. As depicted in FIG. 2, the detonation device 34 will initiate the explosion of explosive element 30A. Barrier element 32A will delay but not prevent the explosion of explosive element 30A from initiating the explosion of explosive element 30B. Upon the explosion of explosive element 30B the propagation to explosive element 30C will be delayed but not prevented by the barrier element 32B. In like manner the explosion propagation from explosive element 30C to explosive element 30D will be delayed but not prevented by the barrier element 32C.

Suitable inert materials for use in the barrier elements include materials having lower shock velocities, for example, plastics, plastic foams, or mixtures of plastics and ceramic or glass bubbles. These materials reduce the shock velocity and pressure, which requires time for the acceptor explosive to buildup to full detonation velocity. The pressure squared times the shock duration should not be less than that required for the acceptor explosive to detonate.

Low detonation velocity explosives such as baratol (TNT with 20% barium nitrate) can be used to get short time delays.

Intermediate delays can be obtained by use of a coiled length of detonating cord placed within a barrier element that connects two adjacent explosive elements.

Figure 3:
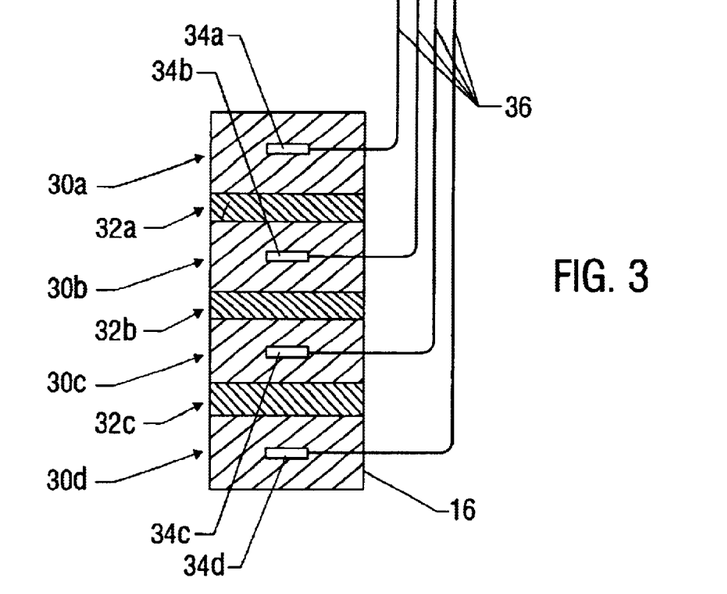
FIG. 3 is an alternative embodiment of the explosive device comprising multiple detonation devices.

FIG. 3 illustrates another embodiment of the present invention in which the explosive device comprises a plurality of explosive elements 30A–D, the individual explosive elements being separated from each other by barrier elements 32A–C. In this embodiment, the barrier elements 32A–C comprise material that will prevent the detonation of one explosive element from causing an adjacent explosive element to explode. Individual detonation devices 34A–D are placed within each explosive element 30A–D and can be activated from the surface by means of a detonation control device (like the one shown in FIG. 2). The detonation control device has the ability to detonate the individual explosive elements at different times in a pre-selected order and with a pre-selected time delay between detonations. The delayed detonations will generate a longer duration explosion that can have beneficial seismic wave characteristics. As mentioned above, the time delays can be chosen to maximize low-frequency seismic waves. The time delays can be on the order of 0.1 millisecond to 100 milliseconds, depending on the desired shape of the output signature (pressure vs. time) sought.

An electrical charge from the detonation control device 28 (as shown in FIG. 2) will be transmitted through the individual detonation wires 36 to the various detonation devices 34A–D which are located within the explosive elements 30A–D. As depicted in FIG. 3, the detonation of detonation device 34A will result in the explosion of explosive element 30A but will not initiate the explosion of the other explosive elements. Likewise, the detonation of detonation device 34B will explode only explosive element 30B, and so on for subsequent elements.

Figure 4:
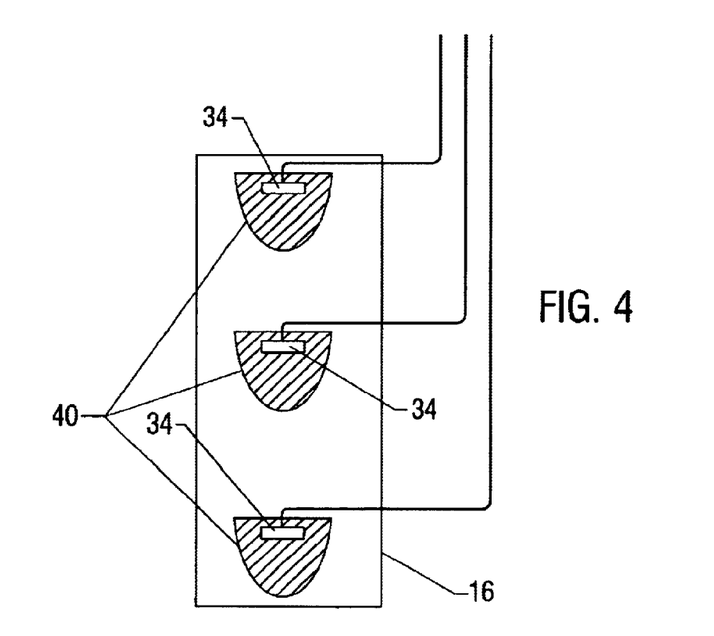
FIG. 4 is an alternative embodiment of the explosive device comprising multiple shaped charge explosive elements.

FIG. 4 illustrates an alternate embodiment of the present invention in which the explosive device comprises a plurality of shaped charges 40. Individual detonation devices 34 are connected to the shaped charges and can be activated from the surface by means of a detonation control device. The detonation control device has the ability to detonate the individual shaped charges in a pre-selected order and with a pre-selected range of time delay between detonations. The delayed detonations can generate a longer duration explosion that will have beneficial seismic wave characteristics. Shaped charges can be utilized to focus the explosive energy in a directional manner, for example, in a generally downward direction, in a generally northern radial direction or in a generally east/west orientation plane. Alternate embodiments can position the shaped charges in a manner to allow the detonations to produce alternating or sequential directionally focused explosive impulses. It is also possible to place an array of shaped charges such that they are horizontally spaced from each other, rather than being vertically spaced as shown in FIG. 4.

FIGS. 1–4 show embodiments of the present invention in which the explosive elements are placed vertically on top of each other. Other embodiments of the present invention could include the placement of the explosive elements within separate adjacent boreholes whereby the ground between the boreholes act as the barrier element. The separate adjacent boreholes will typically be <100 feet from each other, can be <50 feet from each other and can also be <10 feet from each other.

Figure 5:
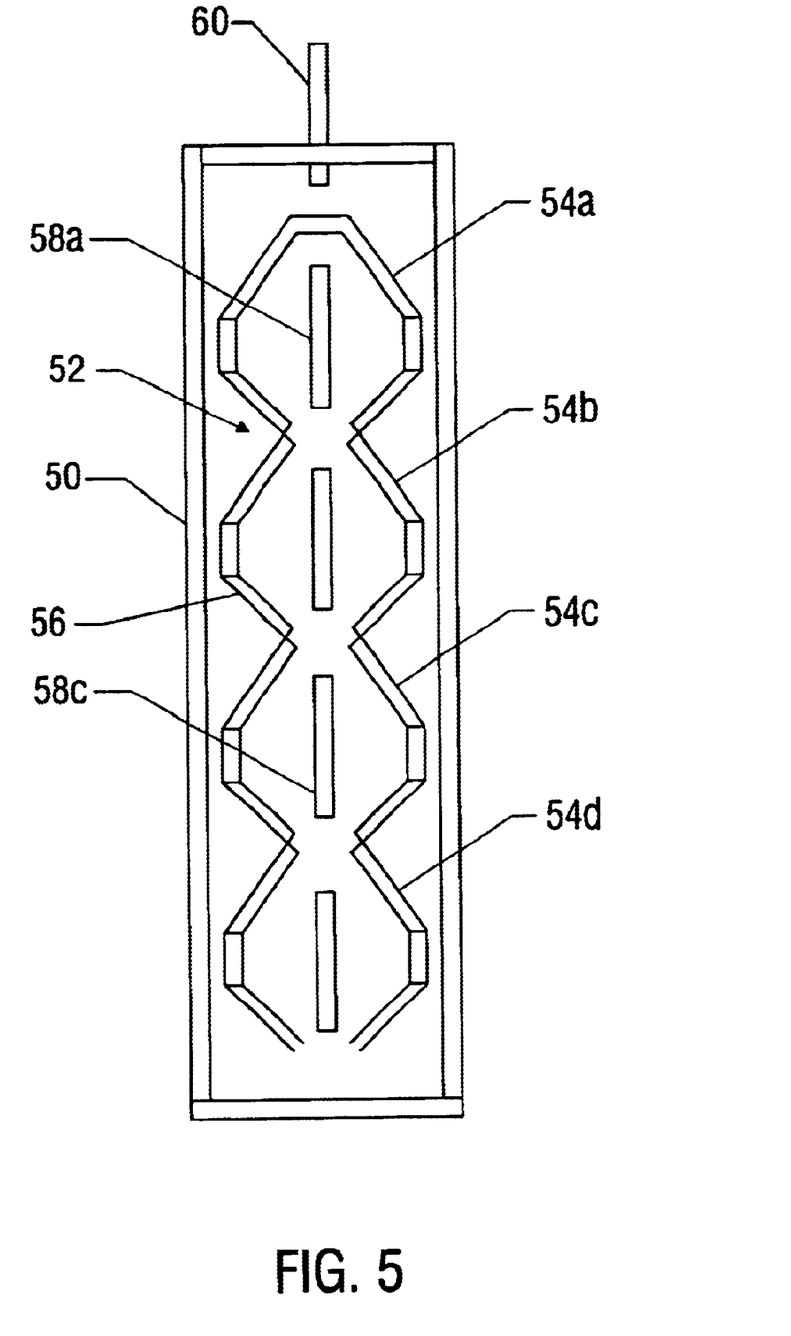
FIG. 5 illustrates an embodiment of the present invention in which the explosive device comprises a modified shaped charge having cascading jets.

FIG. 5 illustrates an embodiment of the present invention in which the explosive device comprises a shaped charge device having cascading jets. A housing 50 contains the explosive material 52 that surrounds the multiple shaped charges 54A–D. The shaped charges comprise a metal liner 56 that is conical in shape and will produce a high-speed jet 58 upon the detonation of the explosive material 52. The term "shaped charge" is commonly used to describe a combination of a metal liner and an explosive material both contained in a housing. Within this application the term shaped charge may also be used to refer to embodiments of the metal liner alone or to various combinations of metal liners and explosive material. The basic theory and operation of shaped charges is known and commonly used in the field of wellbore perforating. The characteristics of the high-speed jet, such as speed, quantity of mass within the jet and the duration of the liner collapse, are dependant on the geometric design of the metal liner, geometric design of the explosive element, and the manner in which the metal liner and explosive element are placed in relation to each other.

In the embodiment shown in FIG. 5 the geometry of the explosive material 52 results in annular sections of various diameters due to the conical geometry of the shaped charges. Once a detonator 60 ignites the explosive material 52, a sequential detonation of each annular section of explosive and its adjacent liner produces a stream of jets 58. The timing and design of the shaped charges are such that the creation of the first jet 58A is prior to the collapse of the liner in shaped charge 54B, and so on. This sequential action produces a stream of jets that can in principle be maintained as long as desired. Further, as products of the conical shaped charges, the jets are stable and contain substantial mass.

The series of shaped charges, an embodiment of which is shown in FIG. 5, can be referred to as a "cascading" configuration of the shaped charges. The metal liners can be physically connected, for example by a die cast process, welding or soldering, and can define a common longitudinal axis and a connected bore through the metal liners. As the metal liners collapse in a sequential order, for example from top to bottom in FIG. 5, the jets that are created can travel through the longitudinal bore in a sequential manner, thus creating a stream of jets that do not destroy the liners they are passing through.

The stream of jets impact the earth and produce an energy source that is focused directionally downward and whose frequency content is determined by the total duration of the impact. This method transfers less energy in the undesirable horizontal and upward directions compared to a typical explosive seismic means. A variation on the embodiment includes a shock-absorbing buffer placed around the outside of the housing to further reduce horizontal energy transfer or coupling. Another variation is to place material on top of the device, such as backfilling with sand or tamping dirt on top of the device, to lessen the possibility of blowing energy up the hole.

In another embodiment, the design is configured to create high-speed slugs of metallic mass instead of jets. These are sometimes referred to as "kinetic energy rods" and are similar to designs used for penetrating tank armament. Designs that produce metallic slugs can convert more of the explosive energy into an imposed force than a shaped charge jet, but the metallic slugs travel at substantially lower speed than the jet does. Due to the slower speed of the metallic slugs, there would typically have to be a time delay between the individual sections. This can be done with a suitable selection of low detonation speed transitional explosive, such as baratol, placed between the annular sections of explosive material or can be done by providing each section with its own detonator with a built-in time delay. The characteristics of the slugs of metallic mass such as speed, amount of mass and duration of the liner collapse are dependant on the geometric design of the metal liner, geometric design of the explosive element, and the manner in which the metal liner and explosive element are placed in relation to each other.

Figure 6A:
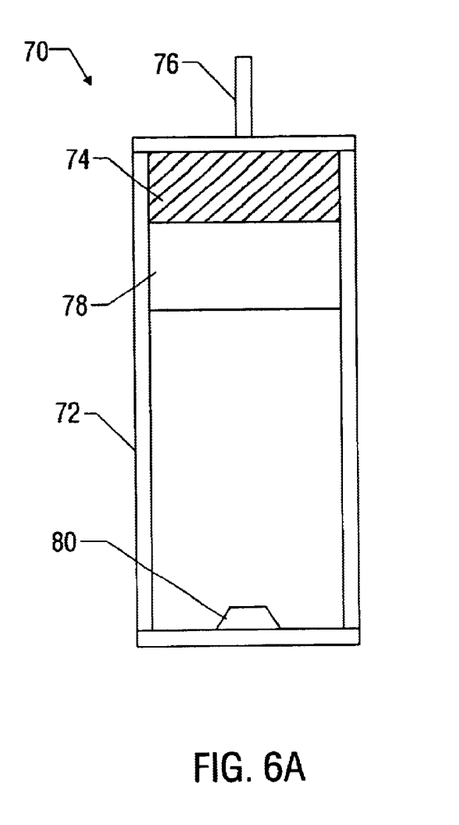
FIGS. 6A and 6B show a further embodiment of the invention comprising a flyer m ass and a spring.
Figure 6B:
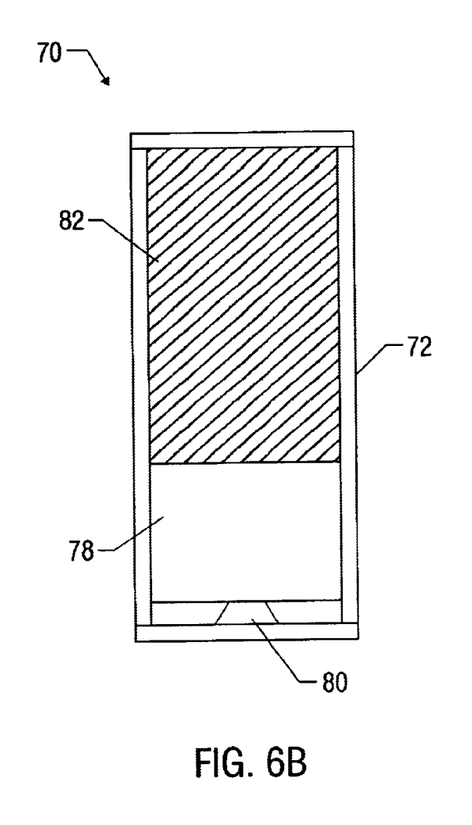

FIGS. 6A and 6B show a further embodiment of the invention comprising a flyer mass and a spring. U.S. Pat. No. 4,805,726 to Taylor and Brooks discloses a seismic source comprising a flyer mass and is incorporated by reference herein. The device shown generally as 70 comprises a housing 72, explosive material 74, detonator 76, flyer mass 78, and spring 80. The flyer mass 78 is located below and is typically in contact with the explosive material 74. The explosive material 74 has a mass chosen to propel the flyer mass 78 to a high velocity that can be calculated numerically or approximated by the Gurney Energy method. Details on the Gurney Energy method can be found in the publication: *Explosive Effects and Application,* Zukas, Jonas A., Walters, William P., Springer 1998, Chapter 7.

A detonator 76 ignites the explosive material 74, producing expanding explosive gases 82 that accelerate the flyer mass 78. A spring 80 decelerates the mass, producing a force imposed on the earth whose maximum amplitude (Fmax=√(k*M)v) is determined by the velocity of the flyer mass (v) and the ratio of the mass of the flyer mass (M) to the spring constant (k). Due to the action of the spring, the duration is one-half of a cycle whose frequency is proportional to √(k/M). If the stiffness (K) of the earth is considered, then the total stiffness of the system is kK/(k+K), and the oscillation frequency is modified accordingly. If the earth is much stiffer than k, then the total stiffness is approximately k. In one embodiment of this particular device the spring is left out and the flyer mass strikes the earth without a dampening effect. The oscillation frequency of the force input is then proportional to √(K/M).

The devices described in FIGS. 1–6 can comprise any of the common explosives used for seismic work, such as (but not limited to) those described from pages 19–26 of this application. The devices described in FIGS. 4, 5, and 6 can use the same explosives, but can also use high explosive compositions including PETN, RDX, and HMX.

The explosive elements can contain any chemical composition having explosive properties. A number of suitable explosive compositions are known by those skilled in the art. In some embodiments of the invention, the explosive composition can comprise a first explosive material and an oxidizable metal material. It is also possible that the explosive composition be essentially nitrogen-free. The explosive composition will typically contain less than about 1 wt % nitrogen, possibly less than about 0.1 wt %, and can be less than about 0.001 wt %. By selecting components for the explosive composition from materials that lack nitrogen, nitrogen emissions can be minimized.

Suitable examples of first explosive materials include trinitrotoluene, dinitrotoluene, nitramines, pentaerythritol tetranitrate, nitrostarch, nitrocellulose, smokeless powders, glycol ethers, glycol ether acetates, formamides, alkanes, polyalcohols and low molecular weight mono-hydroxy alcohols. Various other aldehydes, ketones, amines, amides, and alcohol-amines having explosive properties could also be used. Suitable examples of low molecular weight mono-hydroxy alcohols that can be used as the first explosive material include methanol, ethanol, and isopropyl alcohol. The first explosive material can comprise at least one glycol, such as diethylene glycol, ethylene glycol, propylene glycol, glycerol, or a mixture of one or more of these.

In some embodiments of the invention, the first explosive material can comprise a liquid component and a solid component. One or both of these components can be explosive by itself. It is desirable for the first explosive material to be comprised of about 20 to 80 wt % solids and about 20 to 80 wt % liquids, typically about 65 to 85 wt % solids and about 15 to 35 wt % liquids. The oxidizable metal material can be combined with the solids of the first explosive material.

In another embodiment of the invention, the first explosive material can comprise a binary explosive comprised of at least two components (e.g., one that is liquid and one that is solid) that can be transported separately and mixed on-site. Typically, the individual components of the binary explosive are classified as non-explosive substances for worldwide transport. Also the frequency of on-site mixing can be adjusted to satisfy drill and load production requirements, such that explosive composition is made as it is needed, and the amount prepared is no greater than will be used that same day.

The binary explosive can suitably comprise an organic fuel component and an oxidizer component. Suitable examples of such organic fuel components include diethylene glycol, ethylene glycol, propylene glycol, glycerol, and mixtures thereof. Suitable examples of such oxidizer components, which will often be solid, include ammonium nitrates, alkali metal nitrates, alkaline earth metal nitrates, ammonium perchlorates, alkali metal perchlorates, alkaline earth metal perchlorates, ammonium chlorates, alkali metal chlorates, alkaline earth metal chlorates, hydrates of any of these, and mixtures of any one or more of these materials. The oxidizer component can comprise at least one material selected from the group consisting of sodium perchlorate, ammonium perchlorate, ammonium nitrate, potassium nitrate, potassium perchlorate, potassium chlorate, and lithium perchlorate hydrate. The oxidizer component can also comprise at least one material selected from the group consisting of sodium perchlorate, potassium perchlorate, potassium chlorate, and lithium perchlorate hydrate.

Using a binary explosive offers opportunities for adjusting the arming time of the first explosive material (i.e., whether the binary explosive reaches an explosive state almost immediately after the individual components are mixed, or instead requires a period of time to become explosive). This can be done by adjusting the weight ratio of the oxidizer component to the organic fuel component. For example, if the first explosive material comprises 20 wt % diethylene glycol and 80 wt % sodium perchlorate, about two hours are required after their mixing before the first explosive material is "armed." "Armed" as used here means that the material can be successfully detonated. If it is desired that the first explosive material become armed only after a period of greater than two hours, the proportion of diethylene glycol in the explosive will be reduced accordingly.

Because the explosive compositions of the present invention will be used in widely varying climates, including some environments with very low ambient temperatures (e.g., in Alaska), it is useful for the composition to be resistant to freezing, at least down to temperatures of about −32° C., and more typically down to about −45° C. This can be achieved in the present invention by using as the first explosive material a binary explosive, wherein the organic fuel is a liquid and the oxidizer component is a solid, and the liquid organic fuel component does not freeze above a temperature of about −32° C., and more typically about −45° C. Suitable examples of liquid organic fuel components that will have this characteristic include various compounds such as ethylene glycol, diethylene glycol, propylene glycol, glycerol, formamide, methanol, monoethyl ether, or mixtures of one or more of these compounds. Many other organic fuels that would also act as a fluidizing agent likewise could be used. These materials are all fluidizing agents that promote a liquid being retained in the liquid state at temperatures from about 25° C. to −32° C., more typically from about 50° C. to −45° C.

The oxidizable metal material can comprise at least one material selected from the group consisting of aluminum, magnesium, boron, calcium, iron, zinc, zirconium, silicon, ferrosilicon, ferrophosphorous, lithium hydride, lithium aluminum hydride, and mixtures thereof. Compounds and alloys of such metals can be used as well. The oxidizable metal material may also comprise at least one material from the group consisting of aluminum, magnesium, boron, calcium, iron, zinc, lithium hydride, and lithium aluminum hydride. Often, the oxidizable metal material is aluminum.

The presence of the oxidizable metal in the explosive composition will increase the energy released, reduce the gas volume produced, and reduce the detonation velocity. In general, the higher the metal content of the explosive composition, the lower the detonation velocity. By maintaining a higher sustained energy release, seismic waves of lower frequency and higher amplitude can be generated, which allow for better penetration of the subterranean formation. The rate of energy released by explosion of such a composition will be dependent on the particle size of the oxidizable metal material.

The oxidizable metal material can comprise about 0.5 to 50 wt % of the explosive composition described, alternately about 5 to 50 wt %, and can be about 10–30 wt %. Changing the wt % of the oxidizable metal material in the explosive composition and the grain size of the oxidizable metal material will change the density of the composition.

The oxidizable metal material can consist essentially of a metal particulate. Alternatively, the metal material can be in the form of one or more strips that are in contact with the first explosive material (e.g., a plurality of strips that are spread throughout a continuous matrix of explosive material). Another alternative would be a metal sheath or container that at least partially surrounds or encloses the first explosive material.

When the oxidizable metal is in particulate form, it can have an average particle size of less than about 100 $\mu$m. Typically, the metal particulate has an average particle size of less than about 50 $\mu$m, and can be from about 10 $\mu$m to about 20 $\mu$m. Often the metal particulate is an aluminum particulate.

To prevent the premature reaction of the oxidizable metal material, its surface may be protected with a coating agent. Suitable examples of such coatings include oxides and dichromate. In some embodiments, the surface of the oxidizable metal material can be coated with a material that comprises a fatty acid or a salt thereof. Suitable fatty acids include those having from about 8 to 22 carbon atoms, often about 16 to 18 carbon atoms. Specific examples of fatty acids that could be used include:

Straight Chain Saturated Acids:
  Caprylic acid
  Pelargonic acid
  Capric acid
  Undecylic acid
  Lauric acid
  Tridecanoic acid
  Myristic acid
  Pentadecanoic acid
  Palmitic acid
  Margaric acid
  Stearic acid
  Nondecanoic acid
  Arachidic acid
  Heneicosanoic acid
  Behenic acid
Branched Chain Saturated Acids:
  2-ethylhexanoic acid
Unsaturated Acids:
  10-undecylenic acid
  Petroselenic acid
  Oleic acid
  Elaidic acid
  Vaccenic acid
  Erucic acid
  Brassedic acid
  Linoleic acid
  Linolelaidic acid
  Linolenic acid
  Elaidolinolenic acid
  Pseudoeliostearic acid
  Eleostearic acid
  Arachidonic acid Mixtures of two or more of any of these fatty acids can also be used. Of the fatty acids listed above, oleic acid and stearic acid and mixtures of fatty acids that comprise oleic, stearic, linoleic, linolenic and palmitic acids are particularly suited for this application. Typically, the surface of the oxidizable metal material is coated with stearic acid.

The explosive composition may further comprise at least one material selected from the group consisting of water, emulsifiers, solubilizing agents, binders, thickening agents, gelling agents, cross-linking agents, gassing agents, glass and plastic microbubbles (e.g., small hollow spheres), and bulking agents. The amounts and types of these materials added may be used to adjust the density of the explosive composition. Altering the density of the explosive composition will affect the detonatability of said composition and the nature of the shock front that it generates upon explosion. The density of the explosive composition can be in the range of about 1.6 g/cm³ to 1.9 g/cm³. Such density adjustments may be necessary when the level of oxidizable metal material in the explosive composition, the initial temperature of the explosive prior to detonation, and the type of output seismic energy that is to be generated are taken into account. Emulsifiers, solubilizing agents, binders, thickening agents, gelling agents, and cross-linking agents can help to maintain the uniform distribution of components within an explosive composition, which can be important for an explosion to proceed properly.

An additional benefit of the current invention is that explosive compositions can be shaped to give directivity to the energy released when the explosive composition is exploded. As examples, shaped charges may be used to improve the quality of seismic energy generated for geophysical surveys or may be used to perforate well casings in a specific direction. When the explosive composition is to be used in a shaped charge, the liquid component and solid component may be combined in a first container and then transferred to a shaped-charge container, but the liquid component and solid component can also be combined within a shaped-charge container. In one embodiment of the present invention, the solid component can be prepared in the shaped-charge container and the liquid component is subsequently added to it and combined with it.

The container for the explosive device can be made of molded plastic or it can itself be made of an oxidizable metal material. The explosive composition can be shipped in the container. However, it is also possible to ship the components separately in other containers, pour them into the container on site, and mix as needed before (or after) sealing the container (e.g., by snapping or screwing a top cap onto a cylindrical housing).

For safety reasons, it may be desired that the explosive composition be self-disarming, such that the explosive material becomes non-explosive after it remains in the borehole for a minimum period of time. This can be achieved by using a water-soluble first explosive material, and placing it in a container, such as a cylindrical container with a cylindrical cap that snaps or screws on the larger part of the container. The container is initially watertight, but is designed to fail after a given amount of time at a given depth in the ground (e.g., three months at 60 feet depth below the surface of the ground), allowing groundwater to seep inside the container and dissolve the explosive material, thereby rendering it non-explosive. For example, the bottom of the container could comprise a metal disk having a selected thickness. The metal in this disk would gradually corrode when in contact with groundwater, and would eventually fail as a result of this corrosion, allowing groundwater to enter the container. Increasing the thickness of the disk would increase the time required before failure occurred. An alternate all liquid explosive that can be made self disarming is nitromethane sensitized by about 5% ethylene diamine. This mix can be desensitized after several weeks by the addition of a polycarbonate plastic (Lexan) which slowly reacts with the ethylene diamine until the nitromethane will not detonate.

The explosive materials are detonated by a detonation device, such as a blasting cap, that itself is controlled be a detonation control device. In simpler embodiments of the invention the detonation control device can be as unsophisticated a toggle on-off switch or an electrical lead that is contacted to a battery terminal. In more complex embodiments of the invention the detonation control device can comprise complicated control systems capable of detonating multiple detonation devices in a known order with a predetermined time delay between each detonation.

Sequential detonations can be produced by firing the detonators with controlled time delays between individual detonations. Electronic detonation control devices that can create time delays between individual detonations are currently known and are commonly used within the mining industry. U.S. Pat. No. 3,851,589 to Meyer discloses a solid-state electronic system that produces pre-selected delays in detonating explosive charges.

Alternatively, a length of detonating cord can be used between the charges to impose a time delay between their detonation. A series of detonators having increasing time delays contained in them can all be initiated simultaneously with one firing line, resulting in sequential detonations.

Longer time delays can be obtained if the inert barrier is thick enough to prevent detonation transfer. Then the addition of a pyrotechnic delay can be used, for example, magnesium/Teflon or boron/potassium nitrate for short delays, or tungsten/potassium perchlorate for long delays. In these cases the acceptor explosive is heavily confined, so it will burn to detonation.

All of the methods disclosed and claimed herein can be made and executed without undue experimentation in light of the present disclosure. While the methods of this invention have been described in terms of various embodiments, it will be apparent to those of skill in the art that variations may be applied to the methods and in the steps or in the sequence of steps of the method described herein without departing from the concept, spirit and scope of the invention. More specifically, it will be apparent that certain agents that are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An apparatus for generating seismic waves comprising:
    a housing;
    a plurality of explosive elements enclosed within the housing;
    at least one detonation controller device; and
    at least one barrier element separating the explosive elements, wherein at least one of the barrier element or the detonation controller device is capable of imposing a time delay between detonation of individual explosive elements.

2. The apparatus of claim 1, wherein the barrier element comprises an inert material.

3. The apparatus of claim 1, wherein the barrier element comprises a non-explosive material.

4. The apparatus of claim 1, wherein the barrier element comprises an explosive material having reactive properties different than the explosive elements.

5. The apparatus of claim 1, wherein two or more detonation devices are located within the explosive elements, each detonation device being located in a separate explosive element.

6. The apparatus of claim 5, wherein the detonation devices are connected to the detonation controller device.

7. The apparatus of claim 6, wherein the explosive elements comprise shaped charges.

8. A seismic method, comprising:
    providing an explosive device comprising a housing enclosing a plurality of explosive elements, the explosive elements separated from each other by at least one barrier element;

generating seismic waves by detonating the explosive device in a subterranean formation, wherein the plurality of explosive elements explode at differing times; and detecting at least one of the seismic waves or reflections of the seismic waves with seismic detectors.

9. The seismic method of claim 8, wherein the explosive device is placed in a borehole within the subterranean formation.

10. The seismic method of claim 8, wherein the barrier elements comprise inert material.

11. The seismic method of claim 8, wherein the barrier elements comprise non-explosive flammable material.

12. The seismic method of claim 8, wherein the explosive device further comprises at least one detonation device for detonating the explosive elements.

13. The seismic method of claim 12, wherein each detonation device is connected to a detonation control device that can activate the detonation devices with controllable time delays between individual detonations.

14. The seismic method of claim 12, wherein the explosive device comprises a plurality of detonation devices that are each connected to an explosive element, and the detonation control device detonates the explosive elements at different times.

15. The seismic method of claim 14, wherein the detonation control device provides a pre-selected time delay between the individual detonation devices.

16. The seismic method of claim 15, wherein the time delay between individual detonations is less than 100 milliseconds.

17. The seismic method of claim 15, wherein the time delay between individual detonations is between 0.1 and 100 milliseconds.

18. The seismic method of claim 8, wherein the explosive device comprises a plurality of explosive elements stacked on top of each other in a cylindrical arrangement.

19. The seismic method of claim 8, wherein the explosive device comprises a plurality of explosive elements that comprise shaped charges.

20. A geophysical survey system, comprising:

a seismic energy source comprising an explosive device that comprises a plurality of explosive elements separated by barrier elements, the explosive elements capable of being detonated at differing times;

a detonation control device that is capable of detonating different explosive elements at different times; and a plurality of seismic detectors, adapted to detect seismic waves and/or reflections thereof generated when the seismic energy source explodes.

21. The geophysical survey system of claim 20, wherein the explosive device is located in a borehole within the subterranean formation.

22. The geophysical survey system of claim 20, wherein the plurality of seismic detectors transduce an electrical signal representative of the seismic waves and the reflections of seismic waves they detect.

23. The geophysical survey system of claim 22, further comprising:

a data acquisition and processing system that is in communication with the plurality of seismic detectors.

24. The geophysical survey system of claim 23, wherein the data acquisition and processing system samples the electrical signals generated by the seismic detectors and produces data representative thereof.

25. The geophysical survey system of claim 20, wherein the explosive device comprises a housing that encases the explosive elements and a plurality of inert barrier elements, and wherein each explosive element is separated from the nearest other explosive element by at least one of the inert barrier elements.

26. The geophysical survey system of claim 20, wherein the explosive device further comprises at least one detonation device for detonating the explosive elements.

27. The geophysical survey system of claim 20, wherein each detonation device is connected to the detonation control device that can activate the detonation devices with controllable time delays between individual detonations.

28. The geophysical survey system of claim 20, wherein the explosive device comprises a plurality of detonation devices that are each connected to an explosive element, and the detonation control device can detonate the elements at different times.

29. The geophysical survey system of claim 20, wherein the detonation control device provides a pre-selected time delay between individual detonation devices.

30. The geophysical survey system of claim 20, wherein the explosive device comprises a plurality of explosive elements located on top of each other in a cylindrical arrangement.

31. The geophysical survey system of claim 20, wherein the explosive device comprises a plurality of explosive elements that comprise shaped charges.

32. A downhole seismic source for generating an energy pulse comprising:

a housing;

a detonator; and a shaped charge device located within the housing and comprising an explosive element and a plurality of shaped charges arranged to focus the energy pulse in a predetermined orientation.

33. The seismic source of claim 32, wherein the shaped charge element comprises a plurality of shaped charges positioned in a cascading configuration.

34. The seismic source of claim 32, wherein the shaped charges comprise conical shaped charges arranged in a generally vertical orientation with each other and attached to each other.

35. The seismic source of claim 32, wherein the shaped charges are capable of collapsing upon the detonation of the explosive element to form a jet.

36. The seismic source of claim 32, wherein the shaped charges are capable of collapsing upon the detonation of the explosive element to form a metallic mass.

37. The seismic source of claim 32, wherein the shaped charges are capable of collapsing in a sequential order upon the detonating of the explosive element.

38. The seismic source of claim 37, wherein the sequential collapsing of the shaped charges is capable of imparting an extended directed energy pulse.

39. The seismic source of claim 32, wherein the plurality of shaped charges define a common longitudinal bore within the shaped charge device.

40. A seismic method comprising:

providing an explosive device comprising a housing enclosing a plurality of shaped charges;

detonating the explosive element;

collapsing the plurality of shaped charges;

whereby an extended directed force is imparted onto a subterranean formation, creating seismic waves within the subterranean formation; and detecting at least one of the seismic waves or reflections of the seismic waves with seismic detectors.

41. The method of claim 40, wherein the directed force comprises a plurality of jets.

42. The method of claim 40, wherein the directed force comprises a plurality of slugs of metallic mass.

43. The method of claim 40, wherein the shaped charges collapse in sequential order and there exists a time delay between the collapse of the individual shaped charges.

44. An apparatus for generating seismic impulses comprising:

a housing;

an explosive element located within the housing;

a detonator operably connected to the explosive element; and a mass flyer element located within the housing and capable of moving from an upper position to a lower position.

45. The apparatus of claim 44, wherein the mass flyer is attached to the explosive element.

46. The apparatus of claim 44, wherein the explosive element is capable of being detonated thereby producing expanding gases.

47. The apparatus of claim 44, further comprising a spring, wherein the spring is affixed to the bottom of the housing and contacts the mass flyer when the mass flyer is in its lower position.

48. A method for generating seismic impulses comprising:

providing an apparatus comprising an explosive element and a mass flyer element located within a housing, the mass flyer capable of moving from an upper position to a lower position;

accelerating the mass flyer from an upper position towards a lower position;

impacting the mass flyer onto the bottom of the housing creating a force and imparting the force onto a subterranean formation thereby creating seismic waves; and detecting at least one of the seismic waves or reflections of the seismic waves with seismic detectors.

49. The method of claim 48, wherein a spring is affixed to the housing whereby the spring contacts the mass flyer when the mass flyer is in its lower position.

50. The method of claim 49, wherein the spring decelerates the mass flyer upon contact between the mass flyer and the spring.

51. The method of claim 48, further comprising:

detonating the explosive element, thereby producing expanding gases.

* * * * *